United States Patent Office 3,834,885
Patented Sept. 10, 1974

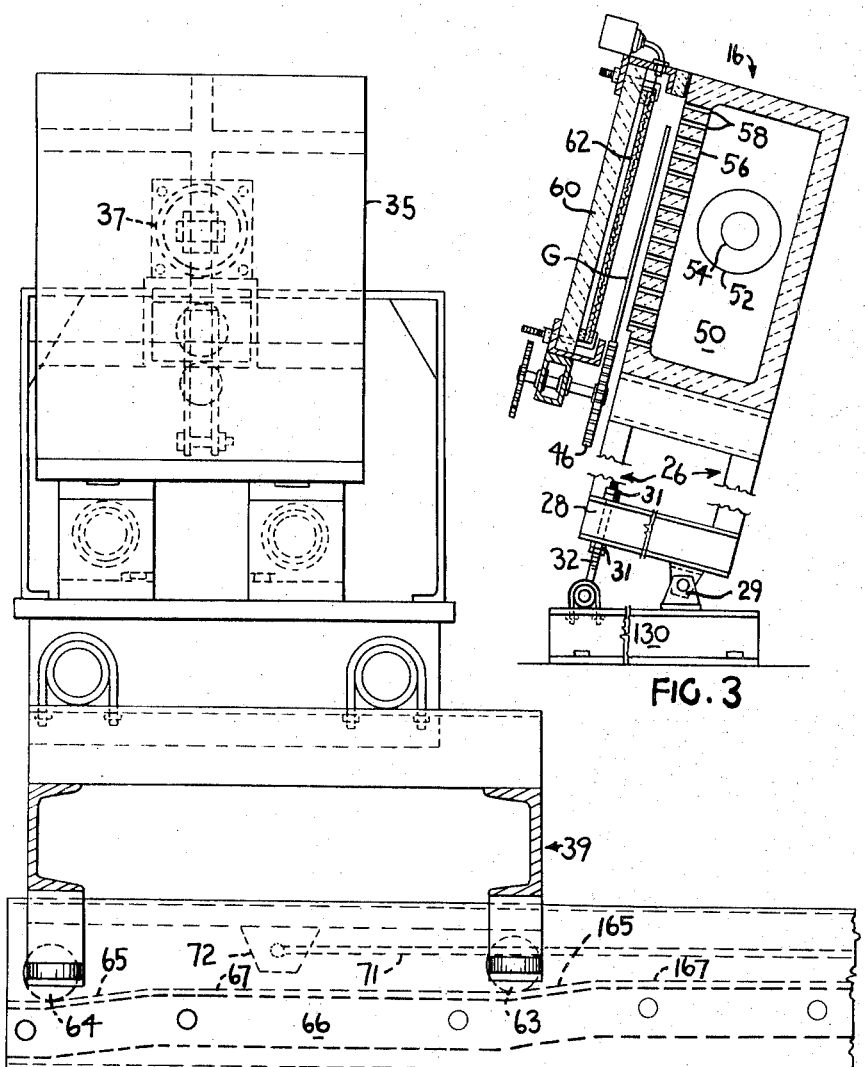

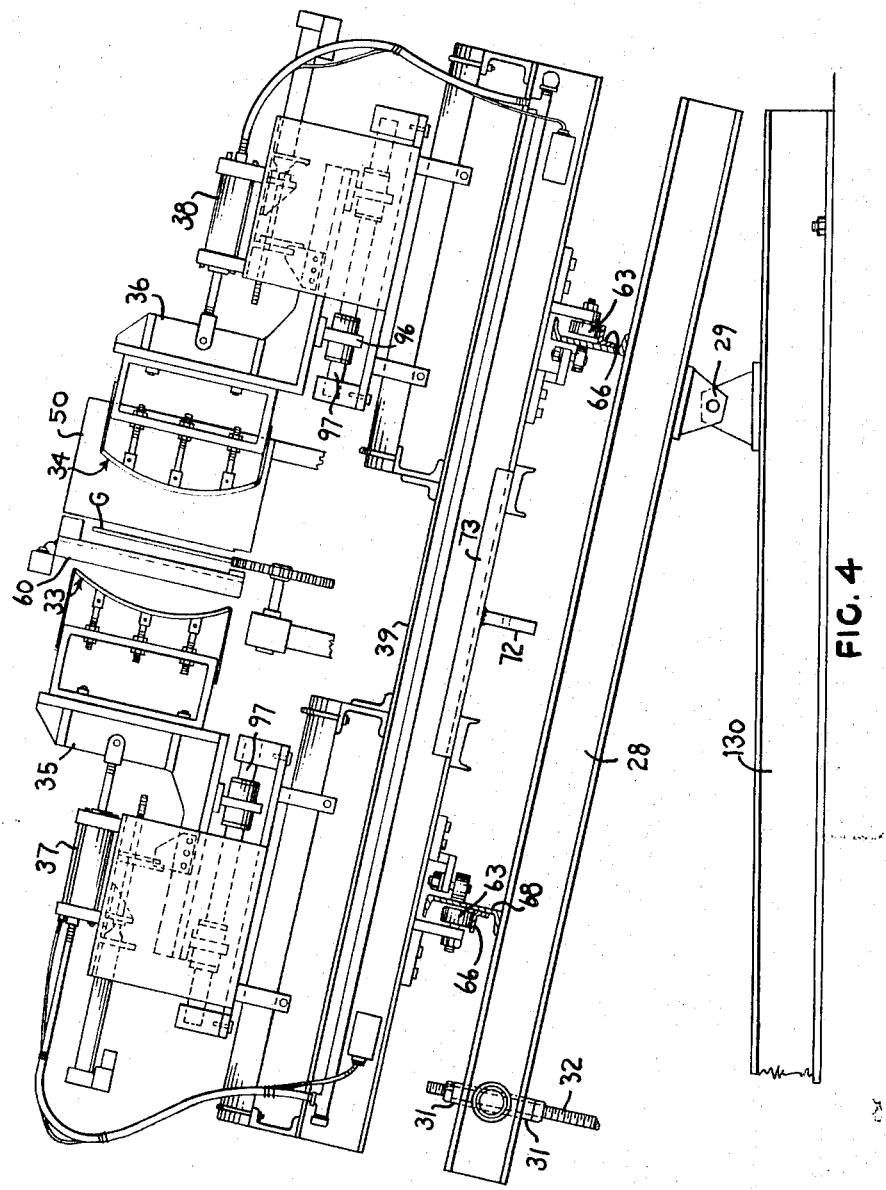

3,834,885
METHOD OF CONVEYING GLASS SHEETS THROUGH A FURNACE
Robert G. Frank, Murrysville, Pa., assignor to PPG Industries, Inc., Pittsburgh, Pa.
Continuation of abandoned application Ser. No. 157,475, June 28, 1971. This application May 9, 1973, Ser. No. 358,782
Int. Cl. C03b 25/04, 27/00
U.S. Cl. 65—106      8 Claims

ABSTRACT OF THE DISCLOSURE

This invention relates to treating glass sheets, and particularly relates to press bending glass sheets by a movable press bending apparatus that engages a glass sheet heated to its deformation temperature and moves with the glass sheet to transfer the sheet while it is being shaped by pressure engagement from a first conveyor to a second conveyor. Means is provided to tilt the conveyors to provide gaseous support in an oblique plane for different thicknesses of glass sheets processed.

CROSS-REFERENCE TO RELATED APPLICATION

This application is a continuation of application Ser. No. 157,475, filed June 28, 1971 now abandoned.

BACKGROUND OF THE INVENTION

This invention is an improvement over apparatus for press bending glass sheets such as depicted in U.S. Pat. No. 3,341,313 to Robert W. Wheeler and Charles R. Davidson, Jr., and U.S. Pat. No. 3,477,840 to W. W. Oelke et al.

In the past, glass sheets have been conveyed through a tunnel-like furnace while heated and supported by either flows of hot gases or a combination of hot gases and radiant heating. The flows of hot gas were sufficient to balance the glass sheets during their heating to deliver them at a deformation temperature to a press bending station.

The glass sheets, on arrival at a press bending station, had to come to a complete stop, and await engagement by press bending molds. After the glass engaging molds impressed their complementary shapes on the heat-softened glass, the molds were retracted and the bent glass began to move toward a chilling station where its opposite surfaces were chilled as rapidly as possible to impart at least a partial temper to the glass. The Wheeler et al. and Oelke et al. patents require that a glass sheet be stopped while engaged between glass bending members.

U.S. Pat. No. 3,457,055 to Brewin proposes to eliminate this stop and start operation by continuously passing a glass sheet between a series of gas boxes having perforated faces of gradually changing curvature to supply hot gases that maintain the glass sheet in spaced relation to the boxes by providing cushions of hot gas and force the glass sheet to develop a curvature conforming to the curvature of the opposing apertured gas boxes. The Brewin patented apparatus avoids the necessity for stopping the glass at a press bending station but fails to provide as precise a shape from sheet to sheet such as is possible for press bending molds to impart by positive direct contact of solid members with the heat softened deformable glass sheets.

SUMMARY OF THE INVENTION

The present invention provides method and apparatus for shaping glass sheets on a mass production basis. For the first time it is possible to press bend glass sheets by sandwiching the sheets between a pair of continuous press bending molds that closely control the shape of the glass sheet throughout its entire extent without requiring the glass sheet movement to be interrupted.

Glass sheets are heated in a tunnel-type furnace provided with gaseous heating means that imparts hot gaseous blasts to one surface of each glass sheet through an apertured furnace wall so as to balance the glass sheet on a cushion of hot gas blasted through openings in the apertured furnace wall. The opposite furnace wall is provided with radiant heating elements which assure rapid heating of the glass sheets to a deformation temperature. In order to make the apparatus adjustable for use with different thicknesses of glass while maintaining a hot gaseous bed between the glass sheets and the apertured wall, the furnace is supported on a frame. The frame is pivotally supported on a base support. Means is provided to adjust the angle at which the furnace and its supporting frame is oriented with respect to the base support and to maintain the angle until a new adjustment is needed.

A first conveyor means comprising a chain has its upper run extending in a first plane to support the lower edge of a series of glass sheets that are conveyed through the furnace. The furnace is oriented with respect to the base support in such a manner that the apertured wall through which gaseous streams are supplied face obliquely upward to support one major surface of each glass sheet passing through the furnace while the opposite surface of the obliquely oriented glass sheet is irradiated by radiant heat provided by the other furnace wall. The first conveyor means defines a path for moving glass sheets that extends through the furnace and into a first mold position occupied by a movable press bending apparatus.

The press bending apparatus comprises the usual complementary shaped press bending molds that engage the opposite surfaces of heat softened glass sheets to impress their curvatures thereon. The press bending molds move toward one another to engage the opposite major surfaces of a heat-softened glass sheet. The molds are supported on a carriage that rides atop cam shaped rails extending in the general direction of the first conveyor means to lift the bottom edge of each glass sheet from the upper run of the first conveyor belt as the glass is being shaped.

Means is provided for moving the entire press bending apparatus including the molds together with the support carriage along said rails from the first mold position in a lower horizontal plane close to the exit end of the furnace to a second mold position in a higher horizontal plane over the beginning of second conveyor means. The latter comprises an upper run for supporting the bottom edge of shaped glass sheets along a path extending beyond the path provided by the first conveyor means through a chilling apparatus and into an unloading station. When the moving pressing molds carry the glass sheets they are shaping from the end of the first conveyor means to the beginning of the second conveyor means, they engage the heat softened glass to impress their shapes onto the sheet during its transfer. When the molds and the engaged glass sheet reach the second mold position adjacent the beginning of the second conveor means, the molds retract to deposit the shaped glass sheet on the second conveyor means.

The press bending apparatus together with the chilling apparatus is mounted on a support frame which is pivotally connected to a base support together with means for moving the press bending apparatus from the first mold position to the second mold position. Means is provided to fix the orientation of the press bending apparatus and the chilling station in alignment with the oblique orientation of the furnace.

The fact that the press bending molds are movable with the carriage that rides along the longitudinal cam rails enables the molds to engage each glass sheet that is processed in turn from approximately the time that it arrives at the first mold position the molds occupy near the exit end of the furnace to the time the molds retract on arrival at the second mold position with the bottom edge of the glass sheet slightly above the upper run at the beginning of the second conveyor. Therefore, the present invention avoids the necessity of stopping the movement of glass sheets from a furnace to a cooling station during the time the glass is being shaped.

It is also possible to maintain sufficient heat in the glass sheet during its shaping by controlling the temperature of the press bending molds so that the temperature loss of the glass sheet from the moment of its release from the engagement provided by the press bending molds to its exposure to the chilling medium provided by the chilling station is a minimum so as to minimize the cooling of the glass from the time it leaves the furnace until it enters the chilling station. This feature enables better tempering of glass of a given thickness and enables the apparatus to handle thinner glass sheets than prior art apparatus.

The various aspects of the present invention will be understood more clearly in a description of a preferred embodiment which follows:

BRIEF DESCRIPTION OF THE DRAWINGS

In the drawings that form part of the description of a preferred embodiment of the present invention and wherein like reference numbers refer to like structural elements:

FIG. 3 is a cross-sectional view of the apparatus of FIGS. 1 and 2 showing the furnace construction;

FIG. 4 is an end view of a shaping station forming part of the apparatus;

FIG. 5 is an enlarged fragmentary longitudinal view of a portion of the transfer apparatus forming part of the illustrative embodiment.

DESCRIPTION OF A PREFERRED EMBODIMENT

Figure 1:
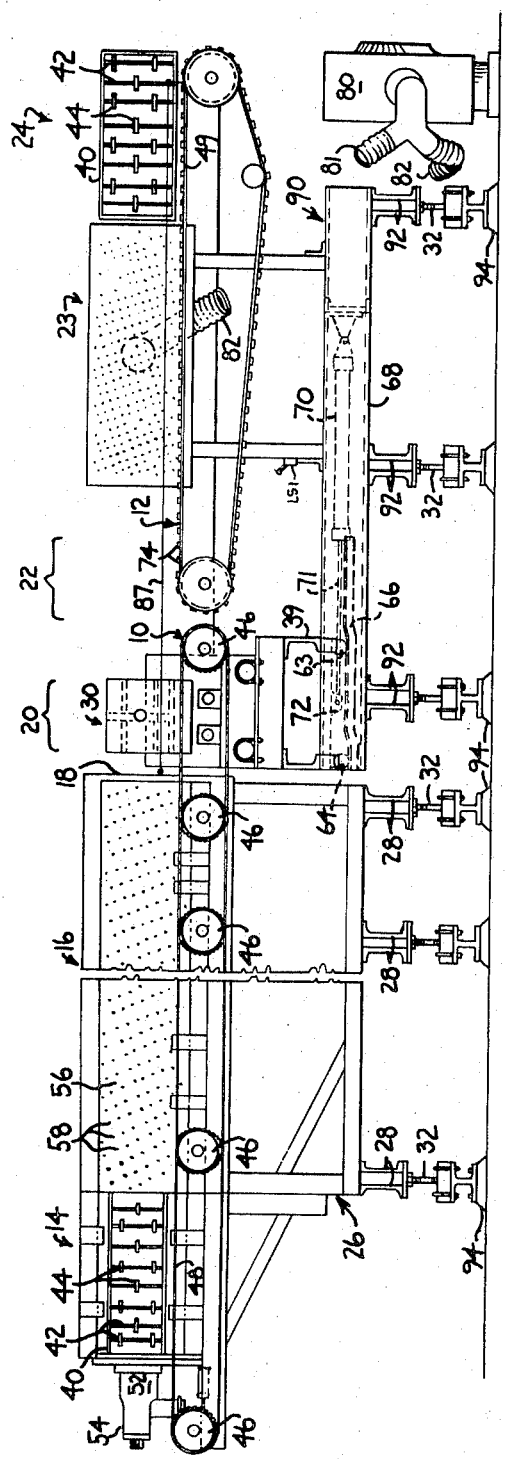
FIG. 1 is a fragmentary longitudinal sectional view of the aforesaid preferred illustrative embodiment.
Figure 2:
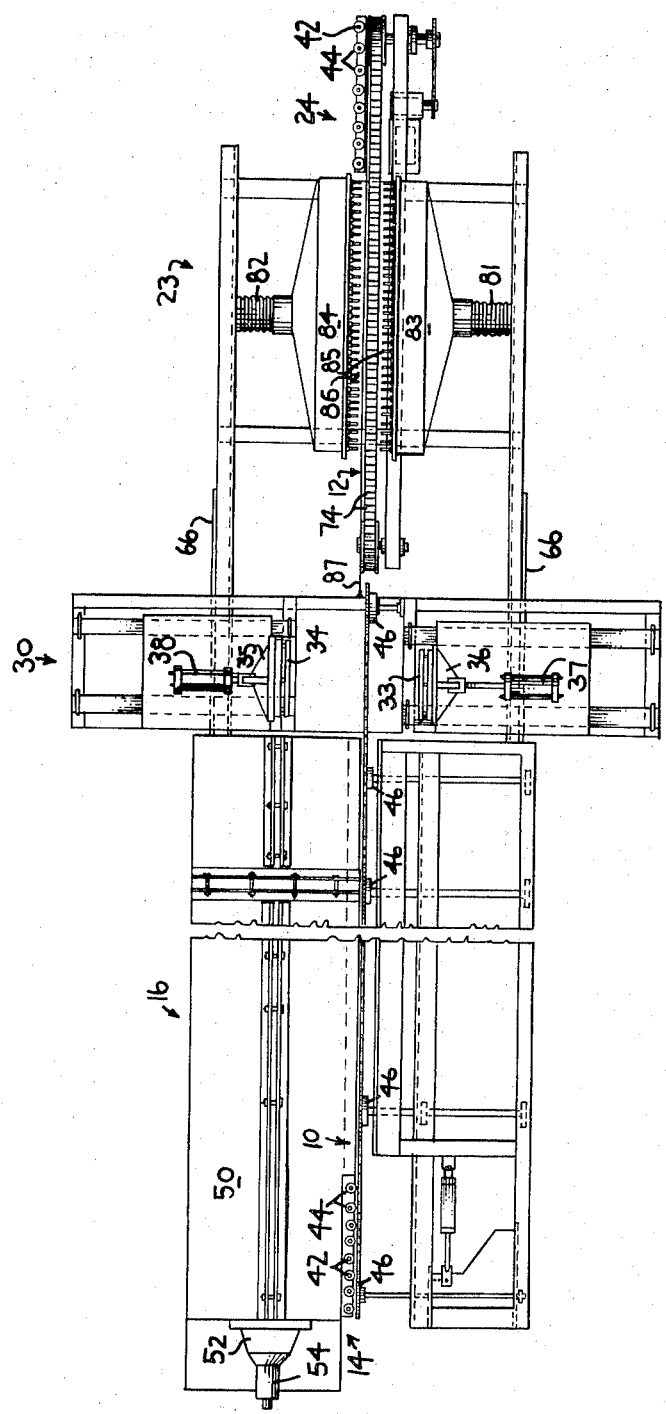
FIG. 2 is a fragmentary plan view taken at right angles to the view of FIG. 1.

Referring to the drawings, and particularly FIGS. 1 and 2, an illustrative embodiment of the present invention is shown comprising first conveyor means 10 and second conveyor means 12 arranged in an end-to-end relation. The first conveyor means 10 begins adjacent a loading station 14 and extends through a tunnel-like furnace 16 and beyond the exit end 18 of said furnace with its front end located slightly beyond a first mold position 20 occupied by a press bending apparatus 30.

The second conveyor means 12 is disposed in end-to-end relation beyond the end of the first conveyor means 10 with its beginning located adjacent a second mold position 22 for the press bending apparatus 30. From its beginning, the second conveyor means 12 extends through a chilling station 23 with its end at an unloading station 24.

Figure 6:
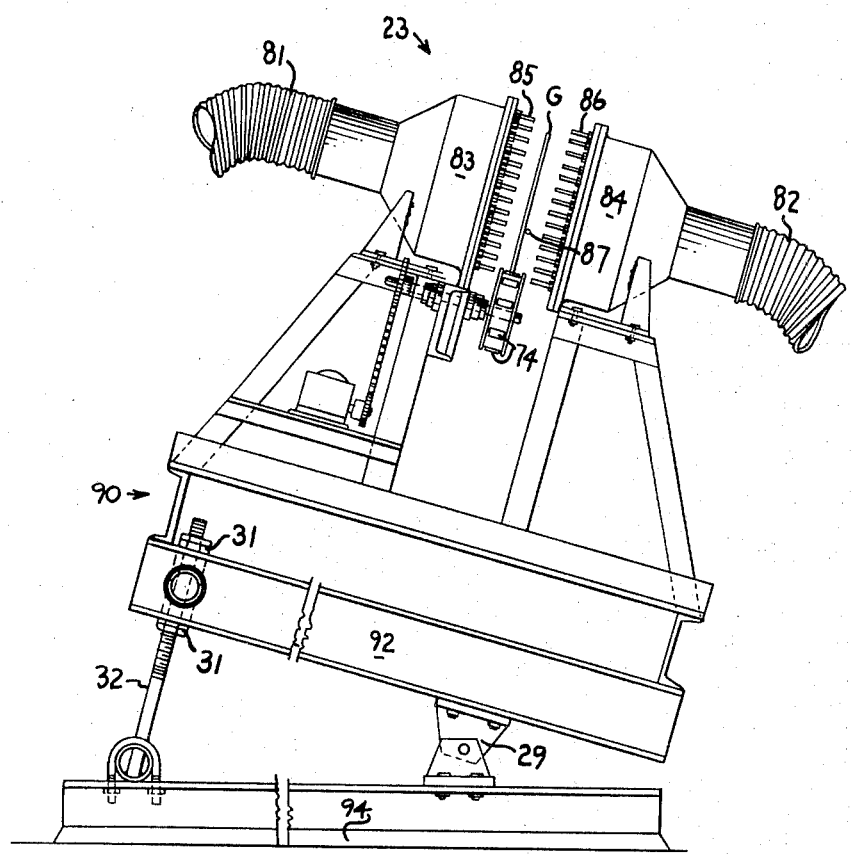
FIG. 6 is a transverse view of a chilling station forming part of the illustrative embodiment of the present invention.

In FIGS. 1 and 2, the furnace 16, the press bending apparatus 30, and the chilling station 23 as well as the loading station 14 and unloading station 24 are shown oriented vertically to facilitate the illustration of the preferred embodiment of the present invention. In actual operation, however, the entire apparatus is oriented at a slight oblique angle to the vertical, as will be explained in detail later and as is shown in FIGS. 3, 4 and 6.

The loading and unloading stations are substantially identical, each comprising a frame 40, which supports a series of axles 42, each of which carry free running rollers 44. The first conveyor means 10 is supported by a series of sprockets 46, one of which is driven by a motor (not shown). The sprockets support a drive chain whose upper run 48 supports the bottom edge of a glass sheet, one of whose major surfaces is supported in rolling engagement against the free running rollers 44 in the loading station 14. The unloading station 24 has a similar frame 40 supporting free running rollers 44 mounted on similar shafts 42. The frames 40 are oriented in a oblique plane, with the frame for the unloading station 24 disposed adjacent the upper run 49 of the second conveyor means 12 to enable the rollers 44 of the second frame 40 to provide rolling engagement for a glass sheet whose lower edge is supported on the upper run 49 as the sheet traverses the unloading station 24.

The furnace 16 (FIG. 3) comprises a gas plenum chamber 50 which serves as a reservoir of hot gases. The gas is provided by a gas burner 52 and a fan 54 which blows the hot gas through the gas plenum chamber 50 along the entire length of the furnace 16. The gas plenum chamber 50 has an inward facing, longitudinally extending apertured wall 56 disposed to one side of a plane of support provided by the upper run 48 of the first conveyor means 10. Thus, hot gas blown through the gas plenum chamber 50 is forced out through the openings 58 in the apertured wall 56 to form a gas support bed for glass sheets G conveyed through the furnace. The opposite wall of the furnace 60 supports a series of electrical heating elements 62 which irradiate heat onto the surface of the glass sheets opposite the surface exposed to the blasts of hot gas discharged through the apertures 58. Conduits for supplying electrical energy to the electrical heating elements 62 is provided through the furnace roof in a manner depicted in FIG. 3.

The furnace 16 and the loading station 14 are supported on a furnace support frame 26 (FIG. 1 and 3). The latter rests on a series of cross beams 28. The cross beams 28 are mounted in angular relation to a series of cross base members 130 through pivots 29. The angle is maintained by lock nuts 31 adjustably secured along the length of externally threaded adjusters 32 interconnecting the cross beams 28 with the cross base members 130 in spaced relation to the pivots 29.

It is a simple matter to adjust the orientation of the furnace 16 and the loading station 14 with respect to the base to which the furnace and loading station are pivotally mounted. A jack (not shown) is positioned on cross base member 130 in retracted position and is extended until it supports the mass of the pivoted superstructure. Lock nuts 31 are loosened to enable the jack to pivot the superstructure relative to the base. When the desired angle of orientation is obtained, the lock nuts are retightened to support the pivoted superstructure in its desired orientation with the furnace walls oriented at a small oblique angle to the vertical.

The apertures 58 in the apertured wall 56 are disposed in oblique rows and the particular arrangements of the rows, the size and space between adjacent openings and the amount of hot gas provided through the burner 52 and the blower or fan 54 can be adjusted as desired to insure that glass sheets being processed as supported in balanced condition. It is preferred, however, to establish a given set of conditions so that whenever it is necessary to change production from glass sheets of one thickness to glass sheets of another thickness, all that is needed is to adjust the angle at which the furnace 16 and the other pivotable superstructure is oriented relative to the base members.

Referring now to FIG. 4, the press bending apparatus 30 is shown as comprising a pair of press bending molds 33 and 34 having complementary shaping plates suitably attached to back up brackets 35 and 36 respectively, the latter in turn being movable in response to actuation of pistons 37 and 38 between a glass engaging state (not shown) and a retracted state such as depicted in FIG. 4. The brackets 35 and 36 may be apertured to provide a flow of hot gas into chambers defined by the shaping plates and removable end and side walls to control the temperatures of the shaping plates of molds 33 and 34.

Preferably, the press bending molds may be provided with suitable covers of fiber glass. Preferably, the covers are formed of knit fiber glass comprised of textured yarn of the type depicted in U.S. Pat. No. 3,148,968 to James H. Cypher and Clement E. Valchar. The covers are secured over the shaping faces of the shaping plates 33 and 34, which are preferably of stainless steel in a manner conventional in the art, by clamps secured to spaced clamp holders.

The molds and their supporting brackets are mounted on sleeves 96 which slide along rods 97 as is depicted in the drawing and as is typical of present day press bending molds. The rods 97 are attached to a mold support carriage 39, provided with front wheels 63 and rear wheels 64 which ride on a pair of parallel cam rails 66. The cam rails are supported on a support structure 68 that carries a carriage position control piston 70 whose rod 71 extends rearward of the piston 70 to an apertured member 72 fixed to a carriage member 73.

The cam rails 66 are shaped to lift the carriage 39 when piston 70 is retracted to move the carriage 39 and the press bending molds 33 and 34 from the first mold position 20 near the end of the first conveyor means 10 to the second mold position 22 near the beginning of the second conveyor means 12.

Specifically, the cam rails 66 are constructed as illustrated in detail in FIG. 5. The front wheels 63 of the carriage 39 are supported on shorter vertical legs than the rear carriage wheels 64 so that front wheels 63 are in a higher plane than rear wheels 64. Each cam rail 66 comprises longitudinally spaced oblique rail portions 65 and 165 of equal length and equal slope spaced from one another a distance equal to the horizontal distance between carriage wheels 63 and 64. Cam rail 66 also comprises a horizontal rail section 67 between oblique rail sections 64 and 165 and another horizontal rail section 167 beyond oblique rail section 165. Carriage wheels 63 are supported on vertical wheel supports that are shorter than those supporting wheels 64 from carriage 39 by a difference in vertical distance equal to the vertical distance between horizontal rail sections 67 and 167.

The second conveyor means 12 is composed of a driving belt of fiber glass or the like comprising spaced lugs 74 that provide spaced support for the bottom edge of glass sheets from the beginning of the second conveyor means 12 in end-to-end relation with the end of the first conveyor means 10 through the chilling station 23 and into the unloading station 24. The upper run 49 of the second conveyor means 12 is disposed in a plane slightly higher than the upper run 48 of the drive chain of the first conveyor means 10, but less than the vertical distance between horizontal cam rail portion 67 and 167 by a small fraction of an inch, preferably ⅛ inch or thereabouts.

The chilling station 23 depicted in FIG. 6 comprises an air blower 80 provided with conduit branches 81 and 82 which lead into a pair of opposed plenum chambers 83 and 84. As is typical with glass chilling apparatus, the plenum chambers are provided with rows and columns of nozzles 85 and 86 extending toward one another in spaced relation to one another on opposite sides of the path of movement taken by glass sheets through the chilling station 23. If necessary, a support wire 87 may be provided to one side of the second conveyor means 12 to help retain a glass sheet in proper oblique position parallel to the position it occupies while traversing the tunnel-type furnace 16.

The spaced plenum chambers are supported on a support structure 90 which also supports the carriage position control piston 70 and the cam rails 66. The support structure 90 is provided with cross beams 92 similar to cross beams 28 for support structure for the furnace support frame 26. Cross beams 92 are pivotally attached to base members 94 through pivots 29 in a manner similar to the attachment of the cross beam 28 of the furnace support frame 26 to the base members 130 and are kept in a desired orientation by lock nuts 31 fixed along the length of additional attachment members 32.

A jack may be used to change the orientation of the support structure 90 in the same manner as is provided for changing the orientation of the furnace support frame 26. The adjusters 32 are adjusted so that the press bending molds 33 and 34 and the cooling plenum chambers 83 and 84 are oriented parallel to the orientation of the furnace 16.

Typical control devices in the form of limit switches and timing circuits of the type well known in the glass processing art are included in the apparatus, so that when a glass sheet approaches the exit end 18 of the furnace 16 at the glass deformation temperature, it is brought into a position between the press bending molds 33 and 34 while the latter are located in their retracted state at the first mold position 20. A conventional glass sensing mechanism at the exit end 18 of the furnace 16 actuates the retracted mold actuation pistons 37 and 38 to move toward one another to their glass engaging position while piston 70 retracts its piston rod 71 to move the carriage 39 at the speed at which the upper run 48 of the first conveyor means 10 is conveying glass sheets. As the wheels 63 and 64 of the carriage 39 move along the cam rails 66, they lift the glass engaging molds 33 and 34 so that the bottom edge of the glass sheet is lifted from the upper run 48 of the first conveyor means 10 to a plane slightly higher than that occupied by the upper run 49 of the second conveyor means 12.

The aforesaid apparatus insures that the carriage and its supporting molds are maintained in horizontal orientation parallel to the paths provided by the upper runs 48 and 49. At the same time, the carriage 39 and its supported molds 33 and 34 tilt with the pivotable support structure 90 transverse to said paths.

When the carriage 39 and the molds reach the second mold position 22, a bumper on carriage 39 engages a limit switch LS–1. The latter, in turn, actuates a conventional timing circuit (not shown) that retracts pistons 37 to move the shaping molds 33 and 34 into their retracted state so that the bottom edge of the press bent glass sheet is deposited onto the spaced lugs 74 carried by the second conveyor means 12. The timing circuit actuated by limit switch LS–1 also causes piston rod 71 to extend to return the carriage 39 with the shaping molds in their retracted state to the first mold position 20.

The bottom edges of the glass sheets undergoing processing are supported on the upper run 49 of the second conveyor means 12 while exposed to pressurized air blasted through the opposite sets of nozzles 85 and 86 as the glass sheets move through the chilling station 23. The spacing between the ends of the opposing nozzles 85 and 86 and the pressure of the air supplied through the plenum chamber and the nozzles in the chilling station 23 is so regulated that the glass sheet undergoing processing remains balanced in spaced relation to the wire 87. However, the wire is provided in case there is some inbalance in air blasts which cause the glass sheets G to pivot toward the lower set of nozzles 86 in the manner in which the plenum chambers are oriented in the illustrative embodiment.

In a typical operation for handling glass sheets of ⅛ inch nominal thickness and less, the apparatus is tilted at an angle of seven degrees from the vertical, and when glass sheets 5/32 inch to 3/16 inch nominal thickness are processed, the angle of orientation with respect to the vertical is changed to five degrees, while a three degree orientation is proper for glass sheets whose nominal thickness is ¼ inch or more. The gas burners supply gas rated at 1059 British thermal units per cubic foot through apertures at a rate of 445 cubic feet per hour supplemented by 54,000 cubic feet of air per hour to supply 470,000 British thermal units per hour while the electric heating elements supply 24 kilowatts of electrical power. The apertures for supplying the air-gas mixture through apertured wall 56 are ⅛ inch in diameter and spaced apart from one another ½ inch in each row with each row spaced apart ½ inch from its adjacent row and the rows oriented at 15 degrees to the horizontal.

In the chilling station, the tempering nozzles are arranged at one inch centers and have a 3/16 inch diameter. Adjacent nozzle rows are spaced one inch from one another and are arranged in rows one inch apart oriented at 15 degrees to the horizontal and parallel to one another.

Each glass sheet arriving at the shaping molds has a temperature of about 1,220 degrees Fahrenheit and is engaged between the molds for 2 to 4 seconds depending on the glass thickness and severity of bend desired. Thus, a complete cycle of mold movements from glass engagement at the first mold position through glass disengagement at the second mold position and return to said first mold position in the retracted state to engagement of a succeeding glass sheet can be accomplished in 8 seconds or less. Glass plates six inches square and ⅛ inch thick have been shaped to form shaped units at a rate of 300 to 400 units per hour using the aforedescribed equipment.

The form of the invention shown and described in this disclosure represents an illustrative embodiment thereof. It is understood that various changes, such as changes in material may be made without departing from the spirit of the invention as defined in the claimed subject matter that follows.

I claim:

1. A method of treating obliquely oriented glass sheets sequentially conveyed on an edge thereof through an elongated furnace, at least one of said glass sheets having a weight component normal to a major surface thereof significantly different than that of another of said glass sheets when conveyed in the same oblique orientation comprising disposing one of said glass sheets at an initial oblique position to the vertical dependent upon said weight component of said one glass sheet, supporting said one glass sheet in said oblique position by applying a gas from an obliquely oriented source thereof at a substantially fixed pressure to and substantially throughout the said major surface in a direction opposite to that of said weight component to maintain said one glass sheet in substantially constant spaced relation to said source of gas, conveying into the path of said gas another glass sheet having the same oblique orientation as said one glass sheet and a weight component normal to a major surface thereof significantly different than the said weight component of said one glass sheet, changing the oblique orientation of said source of gas and said last mentioned glass sheet to a degree sufficient to substantially equalize said weight component of said last mentioned glass sheet with said weight component of said one glass sheet and maintaining said changed orientation so as to support said last mentioned glass sheet in substantially constant spaced relation to said source of gas.

2. A method as in Claim 1 which further comprises radiantly heating the opposite major surface of said glass sheets.

3. A method as in Claim 1 which further includes providing a chilling station adjacent to and in alignment with said source of gas and orienting said chilling station to approximately the same oblique orientation as said source of gas.

4. A method as in Claim 3 which further includes securing said source of gas and said chilling station in the selected oblique orientation.

5. A method as in Claim 1 which further includes providing a press bending and a chilling station disposed in end-to-end relation beyond said source of gas and orienting said press bending station and said chilling station to the same oblique orientation as said source of gas.

6. A method as in Claim 5 which further includes securing said source of gas, press bending station and said chilling station in the selected oblique orientation.

7. A method as in claim 1 which comprises changing said oblique orientation of said source of gas and said last mentioned glass sheet to a smaller angle from the vertical as glass sheets of greater thickness are treated.

8. A method as in claim 1 which comprises changing said oblique orientation of said source of gas and said last mentioned glass sheet to a larger angle from the vertical as glass sheets of lesser thickness are treated.

References Cited
UNITED STATES PATENTS 3,630,706   12/1971   Oelke et al. ......... 65—273 X
3,293,015   12/1966   Fredley et al. ....... 65—182 A X ARTHUR D. KELLOGG, Primary Examiner U.S. Cl. X.R.

65—114, 119, 273